United States Patent [19]

Seyfried et al.

[11] 3,735,083
[45] May 22, 1973

[54] METHOD FOR INDUCTIVELY HEATING AN ELONGATED WORKPIECE

[75] Inventors: Richard F. Seyfried, Parma Heights; Norbert R. Balzer, Parma, both of Ohio

[73] Assignee: Park-Ohio Industries, Inc., Cleveland, Ohio

[22] Filed: Jan. 10, 1972

[21] Appl. No.: 216,642

Related U.S. Application Data

[62] Division of Ser. No. 884,492, Dec. 12, 1969, Pat. No. 3,648,995.

[52] U.S. Cl. .............................. 219/10.41, 219/10.69
[51] Int. Cl. ............................................... H05b 5/02
[58] Field of Search ..................... 219/10.57, 10.41, 219/10.69, 10.75; 266/4 E, 5 E; 148/153, 150, 154, 143, 144

[56] References Cited

UNITED STATES PATENTS

| 3,240,480 | 3/1966 | Cary | 266/4 E |
| 3,472,991 | 10/1969 | Seulen et al. | 219/10.57 X |
| 2,819,056 | 1/1958 | Ayres | 266/4 E |
| 2,787,566 | 4/1957 | Seulen et al. | 266/4 E X |
| 2,657,301 | 10/1953 | Kincaid et al. | 266/4 E X |
| 3,525,842 | 8/1970 | Steinhoff et al. | 219/10.57 |

*Primary Examiner*—C. L. Albritton
*Assistant Examiner*—B. A. Reynolds
*Attorney*—Meyer, Tilberry & Body

[57] ABSTRACT

An apparatus for inductively heating an elongated workpiece preparatory to quench hardening, employing means for conveying the workpiece along a path, a single turn inductor positioned adjacent this path for inductively heating the elongated workpiece, as a unit, while it is being rotated, means for shifting the induction heating means away from the workpiece to clear the workpiece for movement along the path, and means for subsequently quench hardening the workpiece.

4 Claims, 11 Drawing Figures

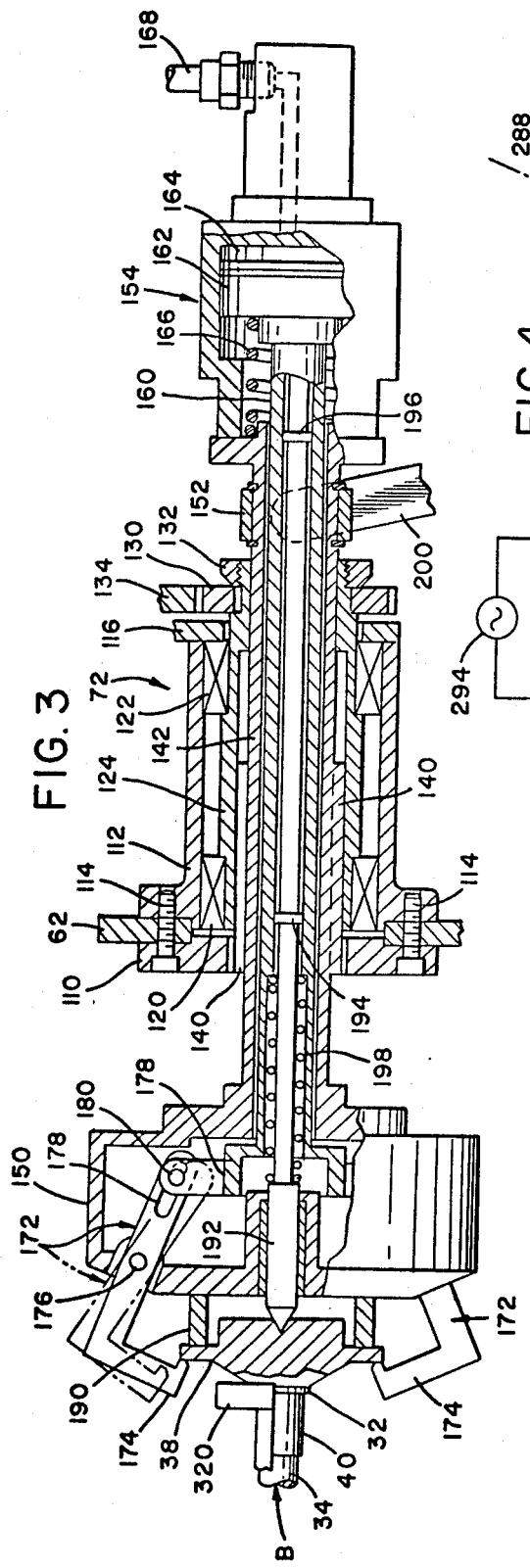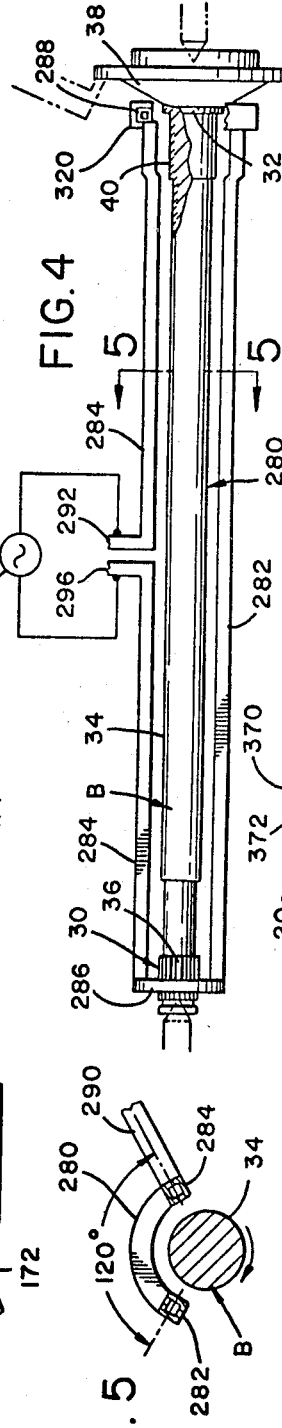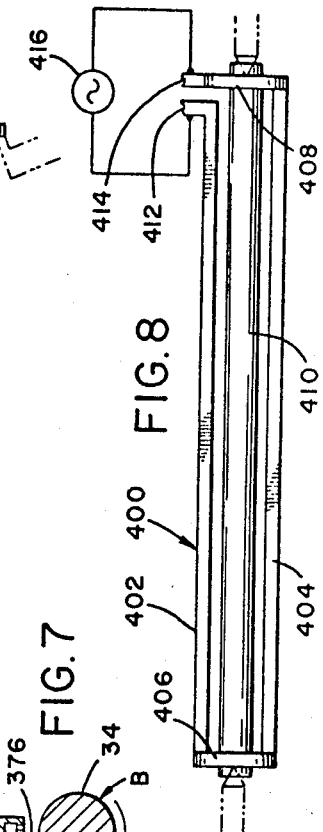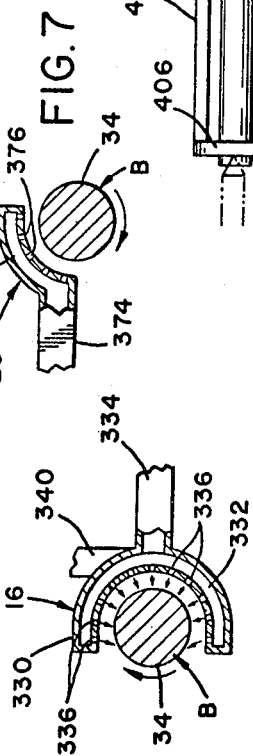

METHOD FOR INDUCTIVELY HEATING AN ELONGATED WORKPIECE

This application is a divisional application of my co-pending application Ser. No. 884,492, filed on Dec. 12, 1969, now U.S. Pat. No. 3648995.

The invention relates to the art of induction heating and more particularly to an apparatus for inductively heating an elongated workpiece preparatory to quench hardening.

This invention is particularly applicable for inductively heating and then quench hardening axle shafts having a flange at one end, and it will be described with particular reference thereto; however, it should be appreciated that the invention has much broader applications and may be used for other elongated workpieces, such as axle shafts without flanges.

It has now become somewhat common practice to quench harden the outer surface of an elongated axle shaft for increasing its torque carrying capacity. A variety of apparatus has been developed for this purpose; however, the most commonly used apparatus includes means for rotating the axle shaft about a vertical axis, an inductor surrounding the axle shaft and movable progressively upwardly to heat the total length of the axle shaft, and a quenching body surrounding the axle shaft for quenching the previously heated surface immediately after the heating operation. This equipment has operated quite satisfactorily and produces a uniformly hardened axle shaft. It has been found that this type of apparatus does present some limitations on the production rate of heating successive axle shafts. Each heating station must be individually loaded and unloaded during which time there is no heating and quenching taking place. Also, the heating cycle is determined by the length of time necessary for the inductor and quench body to progress the total length of the portion of the axle shaft being hardened. This can be a substantial time according to the length of the axle shaft and the rate at which the inductor is moved.

The present invention is directed toward an apparatus for heating and quench hardening an elongated workpiece, such as an axle shaft, which overcomes the disadvantages experienced when employing the previous, most common axle shaft hardening apparatus by substantially increasing the production rate of the apparatus.

In accordance with the present invention, there is provided an apparatus for inductively heating and quench hardening an elongated workpiece having spaced ends and an elongated generally cylindrical body with a longitudinally extending axis. This apparatus comprises conveyor means for conveying the workpiece along a path generally transverse to the axis; means for stopping movement of the workpiece when it reaches a selected position in the path and heating means at this selected position for inductively heating the cylindrical body. This heating means comprises an inductor having a single turn conductor with two generally parallel side legs extending generally parallel to the axis and spaced slightly from the elongated body when the workpiece is at the selected position and end legs electrically connecting the side legs. The side legs extend generally the complete length of the cylindrical body to be heated. There is also provided means for rotating the workpiece about the axis while at the selected position, and means for creating a high frequency current to flow through the conductor to heat the body. The inductor has a first heating position with the side legs closely adjacent the body and extending into the path of movement of the workpiece and a second retracted position with the side legs spaced from the path of movement of the workpiece; means for shifting the inductor into the retracted position as the conveyor means causes the workpiece to approach and depart from the selected position; means for shifting the inductor into the heating position when the workpiece is located in the selected position by the stopping means; and, means for quenching the workpiece after it is inductively heated by the heating means.

By constructing the heating and quenching apparatus in the above-defined manner, the heating and quenching can be accomplished on a conveyor means wherein the loading and unloading takes place at the same time as the heating and quenching operations. In this manner, a succession of workpieces, such as axle shafts, can be heated and quench hardened without necessitating a time delay for loading and unloading workpieces from the apparatus.

The primary object of the present invention is the provision of an apparatus for inductively heating and quench hardening a succession of elongated workpieces, which apparatus reduces the total cycle time for each workpiece.

Another object of the present invention is the provision of an apparatus for inductively heating and quench hardening a succession of elongated workpieces, which apparatus uses a single turn inductor extending the length of the workpiece and shiftable from the workpiece, as the workpiece is moved to and from the inductor along a given path of movement.

Yet another object of the present invention is the provision of an apparatus for inductively heating and quench hardening a succession of elongated workpieces, which apparatus has a production rate dependent upon only the longest of successive operations, instead of the total of the time for these successive operations.

Still a further object of the present invention is the provision of an apparatus for inductively heating and quench hardening a succession of elongated workpieces, which apparatus moves the workpieces in a path from a loading position, to a heating position, to a quenching position, and then to an unloading position on a single mechanism without releasing the workpieces therefrom.

These and other objects and advantages will become apparent from the following description taken together with the accompanying drawings in which:

FIG. 3 is a cross-sectional view illustrating the clamping device utilized in connection with the preferred embodiment of the present invention;

FIG. 4 is an enlarged partial view showing, schematically, the workpiece and inductor contemplated by the present invention;

FIG. 5 is an enlarged cross-sectional view taken generally along line 5—5 of FIG. 4;

FIG. 6 is an enlarged partial view illustrating, schematically, another aspect of the preferred embodiment of the present invention;

FIG. 7 is an enlarged partial cross-sectional view illustrating, schematically, still another feature of the preferred embodiment of the present invention;

FIG. 8 is an enlarged partial view illustrating, schematically, a slight modification of the structure illustrated in FIG. 4; and, FIGS. 9–11 are schematic views showing other embodiments of the present invention.

Figure 1:
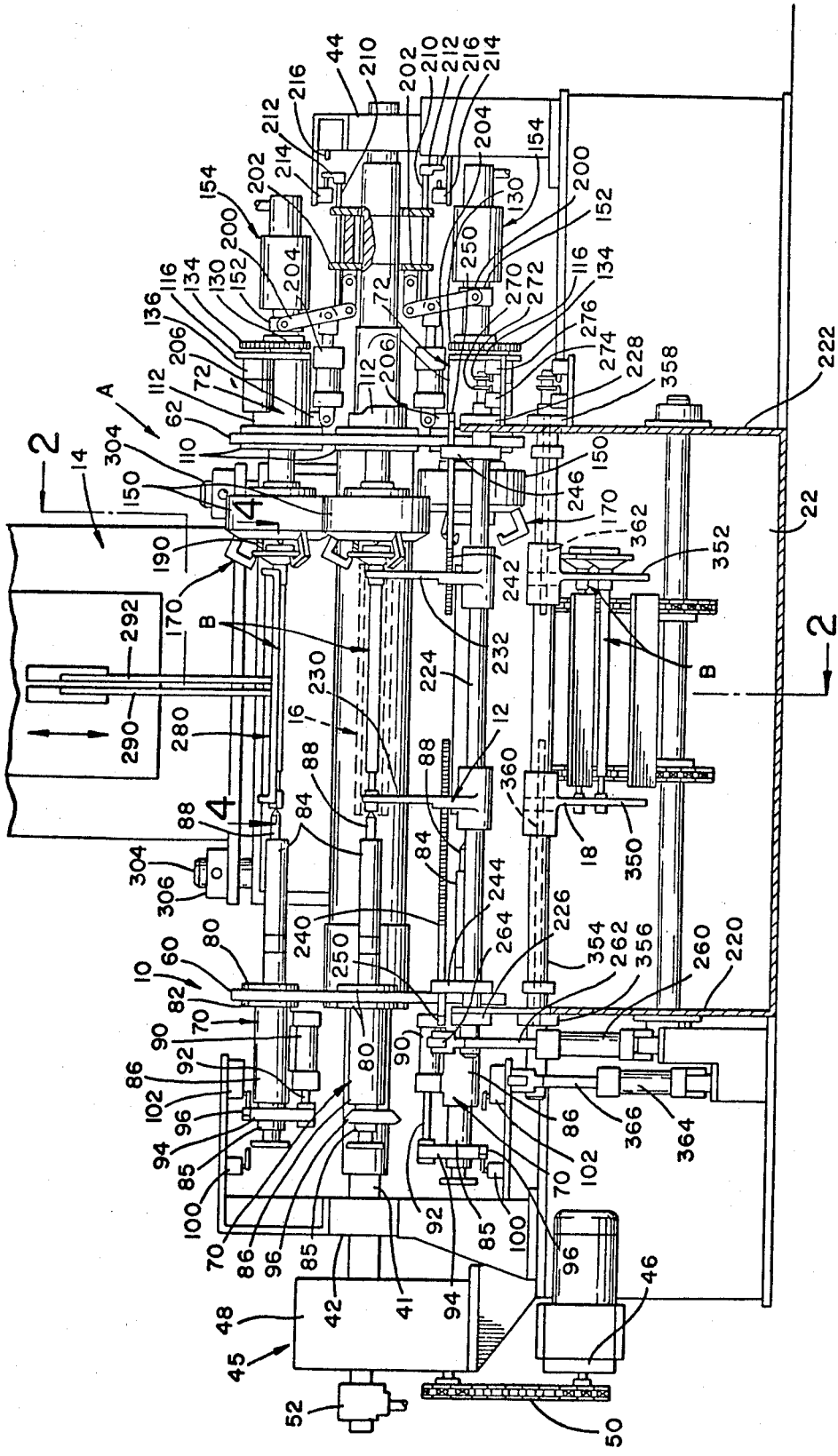
FIG. 1 is a top view illustrating, somewhat schematically, the preferred embodiment of the present invention.
Figure 2:
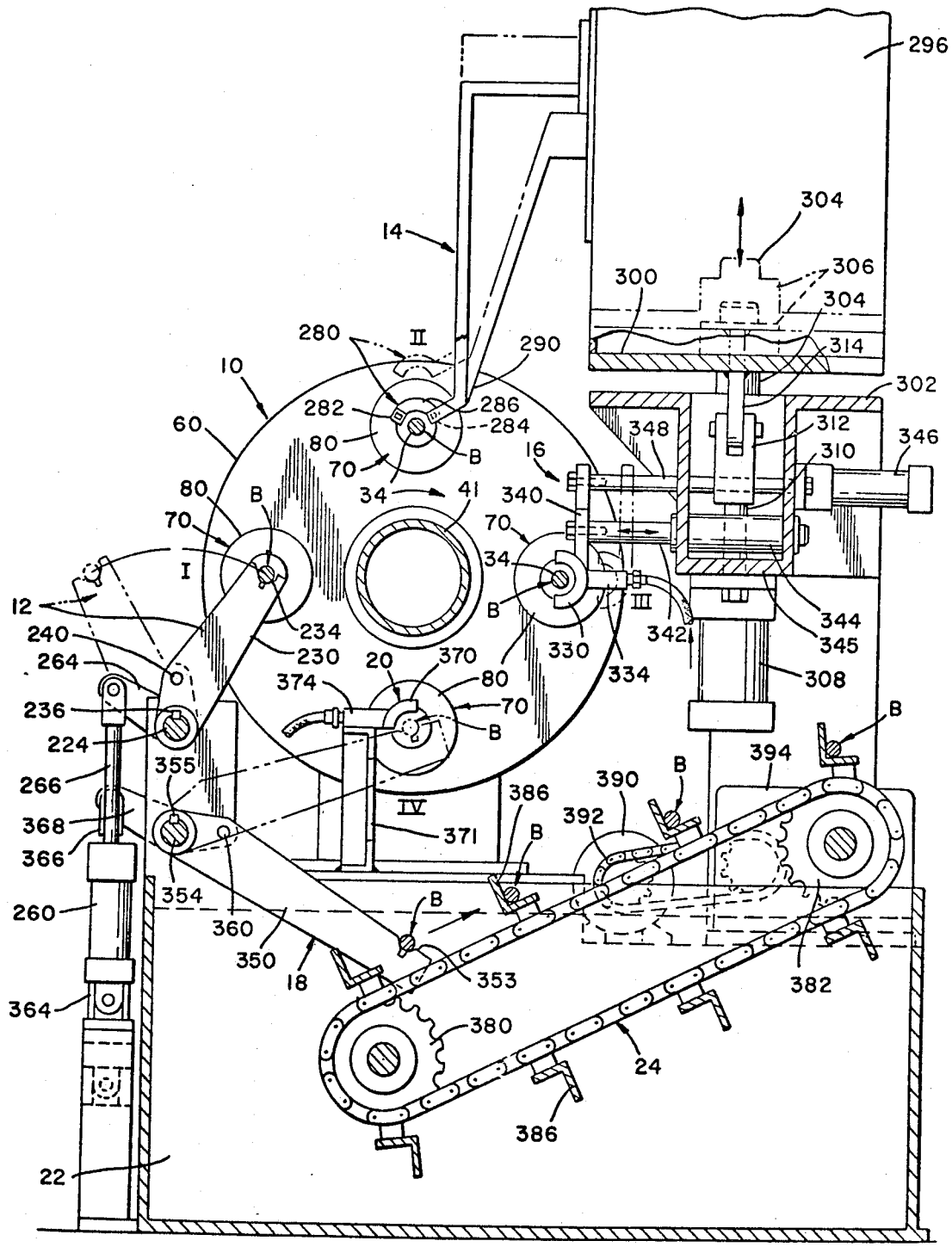
FIG. 2 is an enlarged cross-sectional view taken generally along line 2—2 of FIG. 1.

Referring now to the drawings wherein the showings are for the purpose of illustrating a preferred embodiment of the invention only, and not for the purpose of limiting same, FIGS. 1 and 2 show an induction heating and quench hardening apparatus A for hardening the outer cylindrical surface of a workpiece, illustrated as a flanged axle shaft B. In accordance with the illustrated embodiment of apparatus A, there is provided a conveying and workpiece engaging mechanism, in the form of a turret 10, for moving successive workpieces B between circumferentially spaced positions, identified as I, II, III, and Iv in FIG. 2. Of course, various other types of conveying and work engaging mechanisms could be used without departing from the intended scope of the present invention. At position I there is provided a loading device 12 for loading a workpiece B onto the turret 10. After the turret has been indexed, this workpiece is advanced to position II where there is provided an induction heating device 14 which forms an essential aspect of the present invention and will be described in detail later. Turret 10 then moves the workpiece B TO POSITION III WHERE THERE IS PROVIDED a quenching device 16 which forms another aspect of the present invention and will be described in more detail later. As the turret 10 is again indexed, the workpiece B is moved to position IV where there is provided an unloading device 18 and an auxiliary quenching device 20. Below position IV a quench tank 22 receives the workpieces from the unloading device and an inclined conveyor 24 in this tank removes the workpieces from the apparatus A.

In the illustrated embodiment of the present invention, the workpiece B takes the form as shown in FIG. 4 and includes spaced ends 30, 32 connected by a generally cylindrical body 34. At end 30 there is a commonly used splined portion 36, and at end 32 there is a somewhat commonly used flange 38. It is appreciated that this workpiece may take a variety of forms other than the illustrated form shown in FIG. 4.

As so far explained, a workpiece B is loaded onto turret 10 at position I by the loading device 12. Thereafter, the turret 10 is indexed to bring the workpiece into position II where it is inductively heated, while being rotated in a manner to be described. At the same time, another workpiece is being loaded onto the turret 10 by device 12. Turret 10 is again indexed, approximately 90°, which brings the first-mentioned workpiece B into position III wherein the quenching device 16 quench hardens the heated workpiece to provide the proper hardness on the surface of the workpiece. At this time, another workpiece B is loaded onto the turret 10 at position I. Following this operation, turret 10 is again indexed, approximately 90°, and the first-mentioned workpiece is moved to the position IV. At this position, if necessary, auxiliary quenching device 20 further quenches the surface of the workpiece. Then, the unloading device 18 removes the workpiece from the turret and moves it into the quench tank 22 for reducing the temperature of the workpiece. The unloading device 18 places the workpiece B onto the inclined conveyor 24 where it is conveyed from the tank 22 to an appropriate repository. At this same time, another workpiece B is loaded onto the turret 10 by the device 12. As it can be seen, after each index of the turret 10, a workpiece is loaded and unloaded from the turret. Consequently, the total time for providing one hardened axle shaft is approximately the longest time of the operations performed at the circumferentially spaced positions I, II, III, and IV plus the time on one turret index. By providing the auxiliary quench 20, the cycle time of apparatus A is primarily determined by about one half of the quenching time which means that an axle shaft is hardened in the time required to quench a heated workpiece at position III, plus the time for indexing the turret 10 through one step. This is an improvement over prior devices wherein the loading and unloading time was accumulated to the heating and quenching time to provide a substantially increased apparatus cycle. Also, in those prior devices, the loading and unloading time was critical whereas in the present apparatus these two operations require less time than the heating cycle; therefore, they can be performed more conveniently without reducing the production rate through the apparatus A. This is a substantial advantage over prior axle shaft hardening devices now being used.

CONVEYING AND WORKPIECE ENGAGING MECHANISM

As best shown in FIGS. 1 and 2, the conveying and workpiece engaging mechanism 10 which is basically in the form of a turret, includes central drive shaft 41 having an enlarged center portion and rotatably mounted in spaced journal blocks 42, 44. To index this turret between the four positions, I, II, III, and IV, shown in FIG. 2, there is provided an indexing mechanism 45 which may take a variety of structural forms; however, in accordance with the illustrated embodiment of the present invention, this indexing means includes a motor 46 connected to a gear box, clutch and brake mechanism 48 by a chain 50. Hydraulic coupling 52 provides a swivel connection for introducing the necessary hydraulic lines into the mechanism 48 for causing the mechanism to index, as previously described, by engaging clutches and brakes or similar devices within the mechanism. The details of mechanism 48 may take a variety of forms and for simplicity these well known devices have been omitted. Forming the remaining basic structural elements of the turret 10 are spaced apart circular support plates 60, 62. Onto these support plates there are attached four equally spaced workpiece engaging mechanisms, each including a tailstock 70 and a flange clamp 72. Since all of these mechanisms are substantially identical in structure and function, only one will be described in detail, and this description will apply equally to the other tailstocks and flange clamps.

Referring now to tailstock 70, as best shown in FIG. 1, there is provided mounting flanges 80, 82 for securing the tailstock onto the plate 60. A reciprocally mounted center 84 having a rearwardly extending operating shaft 85 is slidably received within a stationary guide 86 formed integrally with flange 82. Center 84 receives a spring loaded workpiece engaging center 88 for holding the workpieces B along their generally longitudinally extending axes. To reciprocate center 84, there is provided an operating cylinder 90 having a control rod 92 which is, in turn, connected by a bracket 94 with the operating shaft 85 of center 84. This bracket carries a cam plate 96 which coacts with spaced electrical switches 100, 102 for limiting the forward and reverse movement of the center 84 and the spring loaded center 88. The position of the switches may be adjusted to compensate for various sized workpieces. The electrical control circuit into which these switches are incorporated has been omitted for simplicity, since it is not necessary to describe the preferred embodiment of the present invention.

Referring now more particularly to FIG. 3, the flange clamp 72 employs a mounting plate 110 and a housing 112 secured onto support plate 62 by circumferentially spaced bolts 114. At the outboard end of housing 112 there is provided a motor mounting plate 116 for a purpose to be hereinafter described. Axially spaced bearings 120, 122 are provided within the housing 112 for rotatably securing a hollow shaft 124 onto which is connected a driven gear 130 by a gear nut 132. To rotate gear 130 there is provided a driven gear 134 connected to the output shaft of a hydraulic motor 136 secured onto the previously mentioned motor mounting plate 116. As the motor is rotated, this drives hollow shaft 124 which is connected by a sliding key coupling 140 with a drive shaft 142 secured onto the sliding coupling 140. This drive shaft forms the main support structure for the flange clamp 72. On the left end of shaft 142, as viewed in FIG. 3, there is provided a clamp housing 150. At the other end, there is provided a collar 152 for a purpose to be hereinafter described. Adjacent this same end of shaft 142, the illustrated embodiment of the present invention, includes a clamp control mechanism 154 including a hollow shaft 160 extending toward the housing 150, a piston 162, a release cavity 164, a clamping spring 166 and a hydraulic inlet 168. When fluid is exhausted from cavity 164, components assume the position illustrated in FIG. 3. When hydraulic fluid under pressure is introduced into the cavity 164, piston 162 compresses spring 166 and moves hollow shaft 160 to the left for unclamping the flange 38 of the workpiece B, as will be described.

Referring now more particularly to the actual clamping structure of flange clamp 72, there is provided a clamp actuating spider 170 secured onto the extreme end of hollow shaft 160. A plurality of circumferentially spaced arms 172 form the actual clamping element of the flange clamp. Referring more particularly to these arms, as illustrated in the preferred embodiment, they each incorporate a clamping finger 174, a fixed pivot pin 176, a slot 178 and a spider sliding pin 180. When the piston 162 is in the position shown in FIG. 3, the arms 172 are pivoted into engagement with the flange 38 for clamping the flange against a support and locating ring 190. When hydraulic fluid is introduced into cavity 164, piston 162 moves forward which forces pin 180 in slot 178. This rotates the fingers 174 of the arms 172 away from the flange 38.

To locate the workpiece B within the flange clamp 72, there is provided a spring loaded center 192 having sliding bearings 194, 196 and a loading spring 198. By this arrangement, the center 192 is biased outward to provide the centering function during the clamping of the flange onto the ring 190.

To load and unload workpieces within turret 10, it is advisable to shift the flange clamp housing 150 away from the workpiece receiving area. To accomplish this function, various arrangements could be employed; however, in accordance with the preferred embodiment of the present invention, this function is accomplished by a shift lever 200 pivotally mounted onto a mounting plate 202 surrounding shaft 41. A cylinder 204 secured onto bracket 206 may be actuated to pivot the lever 200 away from plate 62 which, in turn, moves collar 152 to the right, as shown in FIG. 3, for retracting the clamp housing 150. When this has been done, the workpiece may be loaded transversely into the turret 10 in a manner to be described later. A switch rod 210 is connected onto the lever 200 to move a switch operator 212 between spaced control switches 214, 216. These switches limit the movement of the lever, and thus the housing 150 by an appropriate electrical circuit, not illustrated.

The above description of the flange clamp 72 contains a description of its operation. To summarize this operation, initially the lever 200 is shifted clockwise, as viewed in FIG. 3, which retracts the housing 150. Also, fluid is introduced into cavity 164 which opens the arms 172. Thereafter a workpiece B is located in front of the flange clamp, and a lever 200 is moved counterclockwise. This engages the spring loaded center 192 against the center in the end of the workpiece to locate the workpiece. Thereafter, hydraulic pressure is released from cavity 164 so that spring 166 drives the arms 172 into clamping engagement with flange 38. This clamps the flange 38 against ring 190. This operation, taken in conjunction with the operation of the tailstock 70 locates the workpiece within the turret 10. When the workpiece is to be rotated, motor 136 is actuated by an appropriate hydraulic force to rotate gear 134 and, thus, gear 130. In this manner, hollow shaft 124 is rotated to drive the housing 150 in a rotary direction. The center 84 is rotatably received within a stationary guide 86 so that it will not interfere with the rotational movement of the workpiece as caused by the motor 136. The purpose of rotating the workpiece at various locations, i.e., positions II, III and IV, will be hereinafter described.

LOADING DEVICE

Referring now more particularly to FIGS. 1 and 2, the loading device 12 includes side plates 220, 222 which rotatably mount a bar 224 in bearings 226, 228. Workpiece receiving elements 230, 232, are secured for sliding movement on the bar 224. Since these elements are substantially identical, only one will be described, and this description will apply equally to the other such element. Element 230 includes a cradle 234 for supporting an axle shaft or workpiece B. A sliding key 236 allows the element 230 to reciprocate on bar 224 without allowing rotational movement with respect thereto. Two threaded adjusting rods 240, 242 are threadably received within elements 230, 232, respectively. These rods are also rotatably mounted in blocks 244, 246 so that they cannot move axially. Ends 250 of these rods are adapted for receiving a wrench so that these rods may be rotated to adjust the position of each element 230, 232 on bar 224. In this manner, workpieces of different lengths can be accommodated in this loading device. After a workpiece has been positioned within the two cradles 234, a cylinder 260 having a reciprocating rod 262 pivots a crank 264 secured onto bar 224. The workpiece is then moved from the phantom line position to the solid line position in FIG. 2. A workpiece is manually placed upon the cradles after the workpiece receiving centers have been retracted and moved into the loading position. Thereafter, the tailstock and flange clamp at position I are actuated to grip the workpiece for subsequent movement by the turret 10. Of course, other arrangements could be utilized for loading the workpiece into the position I of the turret 10.

INDUCTION HEATING DEVICE

Induction heating device 14, best shown in FIGS. 2 and 4, includes a single turn inductor 280 for heating the complete length of the workpiece B. This inductor includes parallel side legs 282, 284 connected by cross legs 286, 288, at the respective ends. In order to direct high frequency electrical current into the inductor, there are provided spaced leads 290, 292 which may be tapped into leg 284 at any position along its length. An appropriate supply of high frequency electrical current is used which supply may take a variety of forms, schematically illustrated as generator 294. This power supply is located within a case 296 supported upon a movable plate 300. Below the movable plate is a stationary or fixed plate 302 on which the movable plate may rest when it is lowered. To guide the vertical movement of case 296 there is provided guide pins 304, only one of which is shown, journaled within bushing 306. A lower cylinder 308 having a ram 310 is connected onto the movable plate 300 by a clevice 312 and a depending arm 314. As illustrated in FIG. 5, the legs 282, 284 are spaced around the circumference of the workpiece B an angular distance of approximately 120°. In this manner, less upward movement is necessary for the inductor by the ram 310 when the workpiece is being moved into and away from the position II.

In operation, after a workpiece has been loaded into turret 10 at position I the ram 310 lifts case 296 which shifts the inductor 280 from the path of movement of the workpiece while travelling from position I to position II in a direction generally transverse to the axis of the workpiece. Thereafter, cylinder 308 lowers the case 296 which brings the inductor 280 into close spacing with respect to the entire workpiece surface. At that time, motor 136 is actuated to rotate the workpiece with respect to the inductor and the generator 294 introduces current flow through the inductor. In this manner, the outer surface of the workpiece B is inductively heated for subsequent quench hardening. It will be noted, in FIG. 4, that the legs 282, 284 are appropriately contoured to provide optimum magnetic coupling between the workpiece and the conductors. In addition, U-shaped laminations 320 are positioned over the end leg 288 for directing and concentrating the flux field adjacent the fillet between the cylindrical portion 46 of the workpiece and the flange 38 of the workpiece. Other appropriate changes could be made in the inductor without departing from the intended scope of this invention. For instance, further contouring of the legs 282, 284 could be used and iron laminations could be employed throughout the total length of the conductors forming the inductor to control and direct the flux field being used to heat the outer surface of the workpiece B.

After the heating cycle, the case 296, and inductor 280, are again lifted by the ram 310 so that the workpiece will not contact the inductor as it is being indexed from the heating position II to the quenching position III.

QUENCHING DEVICE

Referring now more particularly to FIGS. 2 and 6, the quenching device 16 at position III includes an elongated generally arcuately shaped quench body 330 having an internal quench liquid passage 332, a quenching liquid inlet 334 and quenching fluid outlets or apertures 336 on an elongated arcuate surface. The quench body 330 is secured onto a support 340 secured to sliding pins 342, only one of which is shown. These pins are received in bushings 344 mounted upon frame 345. A cylinder 346 actuates a ram 348 to reciprocate the support 340 for moving the quench body into and out of its quenching position.

Before the turret 10 is indexed, cylinder 346 shifts the quench body 330 into the phantom line position shown in FIG. 2. After the workpiece B has been indexed into position III, cylinder 346 is again actuated to lift the quench body 330 into the solid line position shown in FIG. 2. Thereafter, by an appropriate control mechanism, quenching liquid is directed from the apertures onto the cylindrical body portion 34 of workpiece B. During this quenching operation, motor 136 is actuated to rotate the workpiece for uniform quenching of the previously inductively heated outer surface. After an appropriate quenching time, the quenching liquid flow is stopped and cylinder 346 shifts the quench body 330 into its retracted position so that the workpiece can be indexed from position III to position IV.

UNLOADING DEVICE

Referring now to FIGS. 1 and 2, unloading device 18 at position IV includes a pair of spaced unloading arms 350, 352 each having a cradle 353 for supporting a workpiece B. These arms are slidably secured onto shaft 354 by sliding keys 355. Rotation of the shaft is permitted through the use of journals 356, 358 within plates 220, 222, respectively. As in the case of the loading device, threaded adjusting rods 360, 362 are provided for adjusting the spacing between the location of the unloading arms 350, 352. To pivot the arms 350, 352 from the phantom line position to the solid line position shown in FIG. 2, there is provided a cylinder 364 which operates a ram 366 connected onto a crank 368. The crank pivots the shaft 354 for moving the unloading arms.

In operation, after the workpiece is indexed by turret 10 to position IV, the arms 350, 352 are pivoted upwardly to receive the workpiece in cradles 353. At that time, appropriate controls are actuated for lifting arms 172 out of contact with flange 38, shifting the tailstock 70 away from the workpiece, and shifting the flange clamp 72 away from the workpiece. This leaves the workpiece supported by the arms 350, 352. Thereafter, the arms are pivoted downwardly to deposit the workpiece onto conveyor 24 for removal. Details of the conveyor will be described later.

AUXILIARY QUENCHING DEVICE

In some instances, the quenching cycle at position III, for optimum results, will require more time than the heating operation at position II. Instead of increasing the cycle of the turret indexing, it is anticipated that an auxiliary quenching device 20 will be provided at position IV. This quenching device includes an arcuate quench body 370 extending over approximately 90° of the workpiece B. It is on the opposite side of position IV from the workpiece B so that it does not form interference with this workpiece as it is being indexed into position IV. Consequently, the auxiliary quenching device may be fixed on a bracket 371. Within the quench body 370 there is provided internal quench liquid passage 372 and a quench liquid inlet 374. In the arcuate shaped surface facing the workpiece B there are provided a number of apertures 376 through which the quench liquid is passed onto the surface of the workpiece B. This provides an auxiliary, or subsequent, quenching to augment the quenching effected at III. When this auxiliary quenching is used, workpiece B is not unloaded from the turret when the workpiece first moves into position IV. Also, the workpiece is rotated in this position during the quenching operation to provide a uniform auxiliary quench. It is anticipated that this auxiliary quench need not be used if the main quench at position III is sufficient for proper quench hardening of the workpiece.

INCLINED CONVEYOR

Referring now to FIG. 2, the inclined conveyor 24 mounted in tank 22 is positioned below the arms 350, 352 and includes, in the illustrated embodiment, spaced sprockets 380, 382 connected by a continuous chain 384. Workpiece receiving brackets 386 are spaced along the chain to receive and remove workpieces from the arms 350,352 when they are pivoted into the solid line position shown in FIG. 2. The motor 390 drives a chain 392 which, in turn, actuates a gear box 394 for rotating the sprockets 382. This drives the inclined conveyor to remove the workpieces from the unloading device while in tank 22 and convey the workpieces to an appropriate position. Quenching liquid within the tank 22 is at a level so that the workpieces are submerged before being removed from the unloading arms. This provides the final cooling for the workpieces before they are discharged from apparatus A.

OPERATION

The operation of a device A has been described in connection with the various components forming this apparatus; however, it should be appreciated that as the turret indexes a given workpiece from one position to the next, additional workpieces are being loaded onto the turret at position I. Consequently, four workpieces may be on the turret at one time. A cycle for a single workpiece is then determined by the indexing time and the longest operating cycle within the apparatus A. Generally this is the quenching cycle at position III; however, it can be the heating cycle at position II. When the quenching cycle is longer, the auxiliary quenching device 20 can divide the quenching time between the positions III and IV.

In practice the high frequency current used in the heating cycle is 3,000 cycles per second. With the workpiece rotated at 100 revolutions per minute and a power input of approximately 450 Kilowatts the heating time for a 1 inch diameter axle shaft is approximately 12 seconds. Quenching time is approximately 25 seconds, about 12-13 seconds at position III and about the same at position IV. Auxiliary quenching device 20 is continuous; therefore, quenching is effected as soon as the workpiece approaches position IV. This increases the quench time at position IV. Consequently, the quenching time is controlling on the operating rate. The processing cycle, in this instance, would be approximately 13 seconds, plus indexing time of about 3 seconds. The auxiliary quenching device, in this example, is utilized for approximately 12-13 seconds or about the same time as the heating cycle. This is a substantial improvement over the cycle time required for axle shaft hardening machines now commonly used.

OTHER EMBODIMENTS

As previously mentioned, the leg 284 of inductor 280 can be tapped at various positions. This is illustrated in FIG. 8 wherein inductor 400 has parallel legs 402, 404 and connecting legs 406, 408. This inductor is used to heat a workpiece 410 having no end flange. Leg 402 is tapped at one end by two input leads 412, 414 connected across a power source 416.

The preferred embodiment of the present invention involves the use of four separate positions for turret 10. However, various other combinations of turret positions can be employed.

Figure 9:
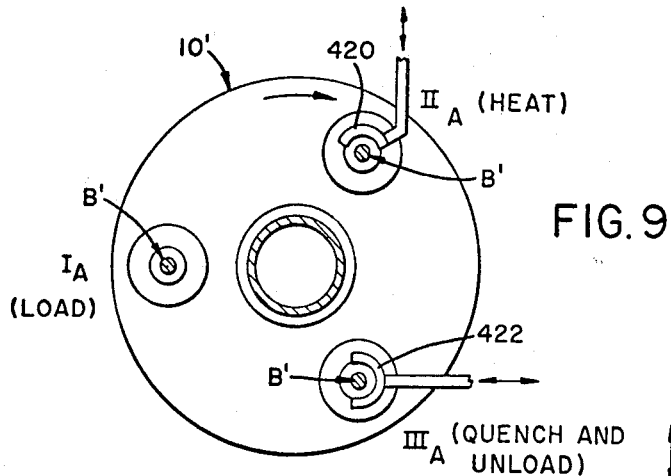

In FIG. 9, turret 10' has three positions, i.e., $I_A$, $II_A$, and $III_A$. At position $I_A$ a workpiece B' is loaded onto the turret. At position $II_A$ an inductor 420 is moved into the heating position, and the workpiece B' is inductively heated. A quench unit 422 is shifted into the illustrated location in position $III_A$ for quenching the workpiece. At this same position, the workpiece is unloaded from turret 10'.

Figure 10:
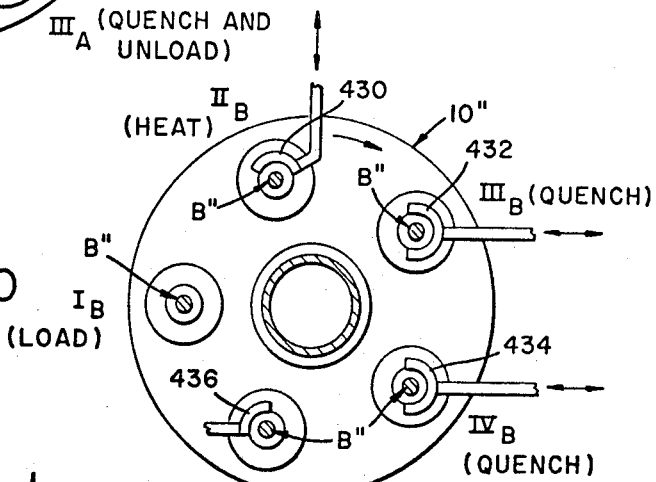

FIG. 10 shows still another embodiment of the invention wherein five positions ($I_B$, $II_B$, $III_B$, $IV_B$ and $V_B$) are employed. In this instance, workpiece B" is loaded onto turret 10" at position $I_B$. At position $II_B$, the workpiece is heated by an inductor 430 shifted into heating relationship with the workpiece. Positions $III_B$ and $IV_B$ are used to quench the workpiece by quench units 432, 434, respectively. An auxiliary quenching device 436 further quenches the workpiece at position $V_B$ before the workpiece is unloaded at this same position.

Figure 11:
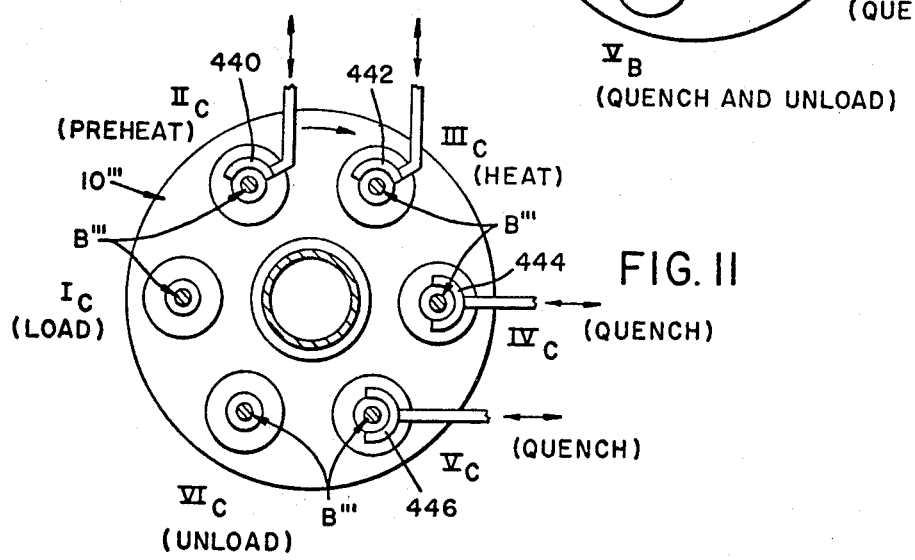

Referring now to FIG. 11, turret 10''' employs six separate positions, $I_C$–$VI_C$. At position $I_C$ workpiece B''' is loaded onto the turret. The workpiece is then preheated in position $II_C$ by a shiftable inductor 440 and finally heated by shiftable inductor 442 at position $III_C$. Quenching devices 444, 446 are shifted into quenching relationship with the workpiece at positions $IV_C$ and $V_C$ for quenching the workpiece. At position $VI_C$ the workpiece is unloaded.

Other similar modifications can be made in the invention to accomplish proper induction heating and quench hardening of the workpieces.

Having thus described our invention, we claim:

1. A method of quench hardening an elongated workpiece having an elongated cylindrical body extending substantially the complete length of said workpiece and having a cylindrical surface and a longitudinal axis generally concentric with said surface, said method comprising the steps of:
    a. conveying said workpiece along a path transverse to said axis and from a first loading position, to a second heating position and then to a third quenching position;
    b. shifting an inductor, having two legs extending generally parallel to said axis and generally the complete length of said cylindrical surface, into coupling relationship with said cylindrical body with said legs extending axially along said surface when said workpiece is at said second heating position;

c. energizing said inductor with a high frequency current while said inductor is shifted into said coupling relationship for a time to heat inductively said cylindrical body as a unit;

d. rotating said workpiece about said axis while said inductor is being energized;

e. shifting said inductor away from said cylindrical body and from said path while said workpiece is in said second position;

f. when said workpiece is in said third position, shifting a quench unit toward said workpiece and into surrounding relationship with said cylindrical body generally over said length;

g. forcing quenching liquid from said unit onto said cylindrical body for quenching said cylindrical body over said length; and, h. rotating said workpiece about said axis while said cylindrical body is being quench hardened at said third position.

2. The method as defined in claim 1 including the additional steps of:
i. conveying said workpiece along said path to a fourth position;
j. discharging said workpiece from said path at said fourth position.

3. The method as defined in claim 1 including the additional steps of:
i. conveying said workpiece along said path to a fourth position;
j. again quenching said workpiece at said fourth position.

4. The method as defined in claim 1 including the additional steps of:
i. conveying said workpiece into a preheat position before conveying said workpiece to said second position;
j. inductively heating said cylindrical body in said preheat position.

* * * * *